United States Patent [19]

Begun et al.

[11] Patent Number: 5,175,826
[45] Date of Patent: Dec. 29, 1992

[54] DELAYED CACHE WRITE ENABLE CIRCUIT FOR A DUAL BUS MICROCOMPUTER SYSTEM WITH AN 80386 AND 82385

[75] Inventors: Ralph M. Begun, Boca Raton; Patrick M. Bland; Mark E. Dean, both of Delray Beach, all of Fla.

[73] Assignee: IBM Corporation, Armonk, N.Y.

[21] Appl. No.: 198,890

[22] Filed: May 26, 1988

[51] Int. Cl.⁵ .......................................... G06F 13/42
[52] U.S. Cl. ............................ 395/325; 364/DIG. 1; 364/243.41; 364/271; 364/271.5; 395/425; 395/550
[58] Field of Search ................ 364/200, 900; 365/189

[56] References Cited

U.S. PATENT DOCUMENTS

| | | | |
|---|---|---|---|
| 4,171,538 | 10/1979 | Sheller | 364/900 |
| 4,189,770 | 2/1980 | Gannon et al. | 364/200 |
| 4,190,885 | 2/1980 | Joyce et al. | 364/200 |
| 4,494,190 | 1/1985 | Peters | 364/200 |
| 4,513,372 | 4/1985 | Ziegler et al. | 364/200 |
| 4,563,754 | 1/1986 | Aoyama et al. | 365/190 |
| 4,623,990 | 11/1986 | Allen et al. | 365/189 |
| 4,630,239 | 12/1986 | Reed et al. | 365/189 |
| 4,686,621 | 8/1987 | Keeley et al. | 364/200 |
| 4,710,903 | 12/1987 | Hereth et al. | 365/194 |
| 4,713,796 | 12/1987 | Ogiue et al. | 365/189 |
| 4,736,293 | 4/1988 | Patrick | 364/200 |
| 4,835,678 | 5/1989 | Kofuji | 364/200 |
| 4,905,188 | 2/1990 | Chuang et al. | 364/900 |

FOREIGN PATENT DOCUMENTS 62-61135 8/1987 Japan.
62-194563 2/1988 Japan.

OTHER PUBLICATIONS

Intel Corporation, "Introduction to the 80386 including the 80386 Data Sheet", Apr. 1986.
Intel Corporation, "82385 High Performance 32-Bit Cache Controller", Jul. 1987.
Intel Corporation, "80386 Hardware Reference Manual", Chapter 7, Cache Subsystems, 1986.
B. C. Cole, How a Cache Control Chip Supercharges 386 Processor, Electronics, vol. 60, No. 12, Jun. 11, 1987, pp. 74–76.
D. Jones et al., The 68030; Electronics & Wireless World, vol. 93, No. 1621, Nov. 1987, pp. 1121–1123.
Intel Corporation, 82385 High Performance 32-Bit Cache Controller, Oct. 1987, pp. 2–65, Chapter 3, 82385 Interface Signals.

*Primary Examiner*—Gareth D. Shaw
*Assistant Examiner*—Maria N. Von Buhr
*Attorney, Agent, or Firm*—John C. Black

[57] ABSTRACT

In an 80386/82385 microcomputer system, the timing requirements placed on non-cache memory components by the 82385 are more stringent than the timing requirements placed on the non-cache memory components by the 80386. The present invention operates on the 82385 cache write enable (CWE) signals, and delays those signals in the event of a read miss. Delaying the CWE signals relaxes the timing requirements placed on non-cache memory components and at the same time does not impact wait state parameters for read miss operations.

3 Claims, 5 Drawing Sheets

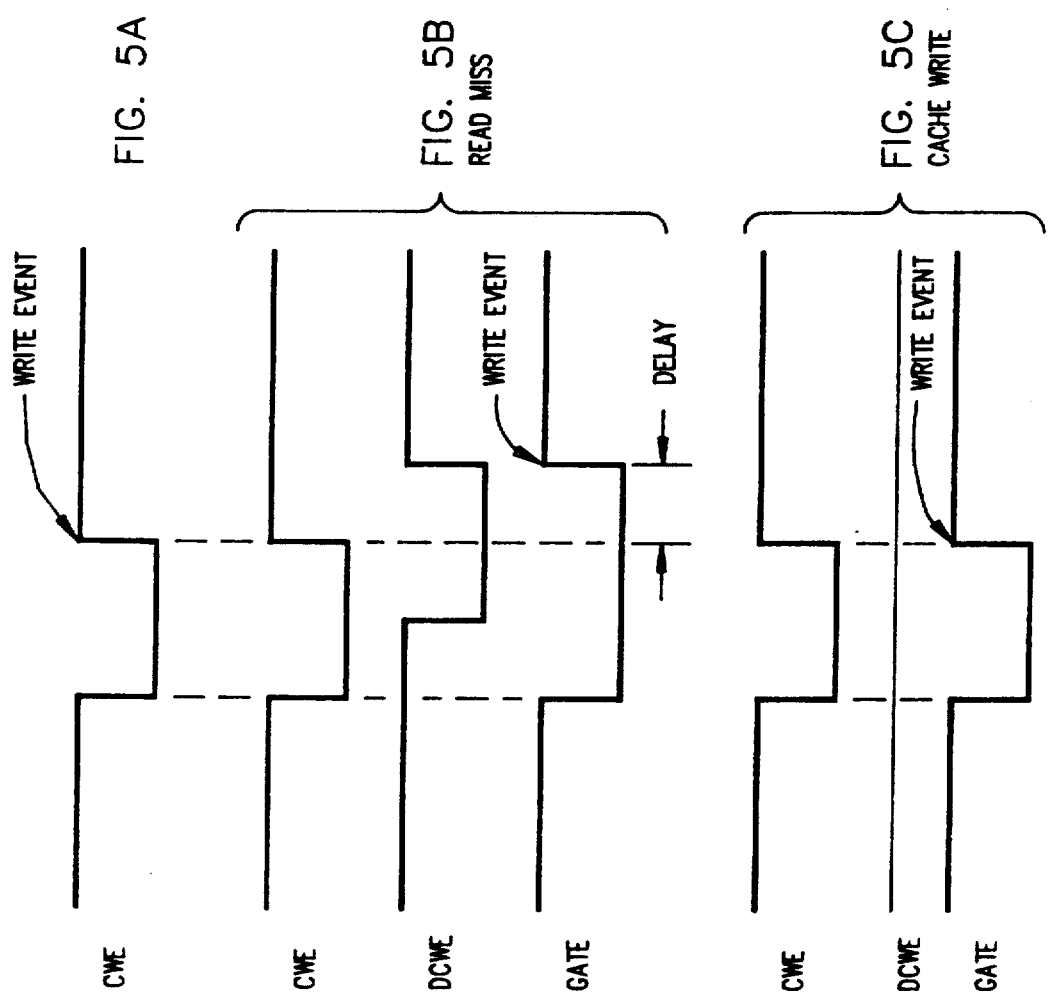

DELAYED CACHE WRITE ENABLE CIRCUIT FOR A DUAL BUS MICROCOMPUTER SYSTEM WITH AN 80386 AND 82385

DESCRIPTION

1. Technical Field

The present invention relates to a multi-bus microcomputer system with a cache memory subsystem and more particularly to an improvement for increasing the tolerance to slow memory components for a cache read miss without impacting wait state parameters.

2. Background Art

Background information respecting the 80386, its characteristics and its use in microcomputer systems including cache memory subsystems are described in Intel's "Introduction to the 80386", April 1986 and the 80386 Hardware Reference Manual (1986). The characteristics and operating performance of the 82385 are described in the Intel publication "82385 High Performance 32-Bit Cache Controller" (1987).

In microcomputer systems, as in other computer systems, speed of operations is an important criterion which in most cases has to be balanced against system cost. Many features which were first introduced to speed up operations in mainframe computers and minicomputers are now finding their way into microcomputer systems. These include cache memory subsystems.

The use of cache memory subsystems results in a multi-bus computer architecture. More particularly, in a microprocessor with a cache memory subsystem, a first bus, for convenience referred to as a CPU local bus, connects the microprocessor (for example an 80386), a cache control (which can include an 82385 cache controller) and a random access memory serving as the cache memory. The CPU local bus may be interconnected via a buffer with a second bus system, for convenience termed a system bus. Other components can be connected to the system bus (either directly or indirectly) such as main memory, input-output equipment, read only memory, etc.

A prime reason for using a cache subsystem is to speed up memory operations by enabling the processor to read from the cache memory subsystem to the extent the required information is stored therein. The cache memory subsystem usually has a speed advantage over the main memory. To the extent that memory accesses can be restricted to the cache subsystem then, the processor does not require access to the system bus. This significantly frees up the system bus for use in other operations, for example input-output operations, DMA, etc. This is another advantage of microcomputer systems with cache memory subsystems.

In order to maintain orderly sequencing of the various operations that must be performed, operations are divided into units of time referred to as clock states. In a microcomputer system employing for example the 80386 processor and 82385 cache controller, the fastest memory operations require two clock cycles, each of two clock states. Other operations which require more than two clock cycles are referred to as having that number of wait states which is equal to the difference between the number of clock cycles required for the operation and the two clock cycles minimum (which is also referred to as a zero wait state).

Since speed of operations is an important criterion, it is an advantage to ensure that, to the extent feasible, operations can be fit into zero wait state operations as opposed to one or two wait state operations, etc.

Cache accesses are one type of operation which is a zero wait state operation.

While desirably as many memory accesses as possible are handled by the cache subsystem, it is of course necessary at times to access main memory. One principle used in operating a cache subsystem is that in the event of a read miss, i.e. a read operation in which the required information is not found in the cache subsystem, the information when read from main memory is immediately written to the cache subsystem. By using this principle, the information read is thereafter available in the cache subsystem (unless overwritten) so that subsequent accesses to the same information need not access main memory.

Thus in the event of a read miss, two operations are required, (1) accessing main memory to read the required information to make it available to the processor and (2) writing to the cache subsystem with the information just read from main memory.

It is a peculiarity of the specification of the 82385 that, in the event of a read miss condition, the information which is to be accessed from main memory is necessarily rewritten to the cache subsystem prior to the time that it must be available to the processor. The chip manufacturer recognizes this condition and suggests one of two alternatives, i.e. either select a sufficiently fast main memory so that the data can be accessed and made available to the 82385 within the time necessary for a fixed wait state operation, or increase the length of the cycle from what would normally be required by adding additional wait state(s) as necessary. While either alternative is practical, the first alternative impacts system cost since the faster memories required to meet the timing specifications of the 82385 necessarily are more expensive, and the second alternative introduces delay into any read miss operation by imposing one or more wait states.

Therefore, it is an object of the present invention to eliminate the necessity for this choice so as to improve system tolerance to slower memory components without impacting wait state parameters for read miss operations.

SUMMARY OF THE INVENTION

The invention meets these and other objects of the invention by providing a logic circuit for selectively delaying cache write enable signals in the event of a read miss condition.

More particularly, the logic circuit includes means for detecting a read miss condition. A read miss condition is indicated when a system Bus Read (BUSRD) is active and a Cache Write Enable (CWE) is also active. The logic circuit further includes means responsive to a cache write enable (CWE) output by the 82385, for delaying the active cache write enable signal in the event a read miss operation is detected.

In a particular embodiment of the invention which will be described, the cache memory subsystem is a two-set associative cache memory thus including two memory banks. The 82385 makes available a specific cache write enable signal for each of the memory banks. The 82385 also generates a cache address latch enable signal (CALEN) as well as chip select signals (CS0, CS1, CS2 and CS3).

The logic circuit in accordance with the present invention operates on the cache write enable signals, that is, the cache write enable signals for both memory banks A and B. When a read miss operation is detected, one of two (cache write enable) gates is partially enabled by the active one of the cache write enable signals (either that destined for the A bank or the B bank). The logic circuit detects the active BUSRD and is also responsive to the cache write enable signals, for the particular signal (for bank A or bank B) which is enabled. The logic circuit delays the active one of the cache write enable signals and after providing the selected delay, fully enables that appropriate one of the gates which is dedicated to the cache bank being written to.

The logic circuit of the invention further includes a plurality of buffers, one for each of the CALEN, CS0, CS1, CS2 and CS3 signals, and these signals are coupled to the cache subsystem through the appropriate one of the buffers.

Thus in the event of a read miss operation, the appropriate write enable signal is delayed. The buffers provide an equivalent gate delay, corresponding to the delay interposed by the cache write enable gate, for the CALEN, CS0, CS1, CS2 and CS3 signals.

In the event a cache write enable signal becomes active (for example to perform a cache write which is not associated with a read miss condition), then the logic circuit does not of course detect a read miss condition so that no delay is imposed by the logic circuit on the cache write enable signal. However, the associated gate does impose a gate delay on this signal and the buffers impose a substantially equivalent delay to the associated CALEN, CS0, CS1, CS2 and CS3 signals.

Thus, one aspect of the invention provides an improved 80386/82385 cache multi-bus microcomputer system for selectively delaying cache write signals following a read miss for improving system tolerance to slower memory components without impacting wait state parameters for read miss operations, said microcomputer system comprising:

a cache subsystem including said 82385 cache controller, a cache memory and a local bus connecting said 82385 cache controller and said cache memory to an 80386 processor, and delay logic means responsive to a cache write condition caused by a read miss for selectively delaying cache write enable signals, said delay logic means comprising:

(a) programmable array logic means with an input coupled to write enable signals from said 82385 cache controller for producing at a write enable terminal a delayed write enable signal in response to an active bus read, (b) a first logic gate with a first input responsive to said write enable signal from said 82385 cache controller and a second input coupled to said write enable terminal and an output coupled to a write enable input of said cache memory.

BRIEF DESCRIPTION OF THE DRAWINGS

FIGS. 5A-5C show operation of the invention for read miss cache writes as well as cache writes not caused by a read miss.

DETAILED DESCRIPTION OF A PREFERRED EMBODIMENT

Figure 1:
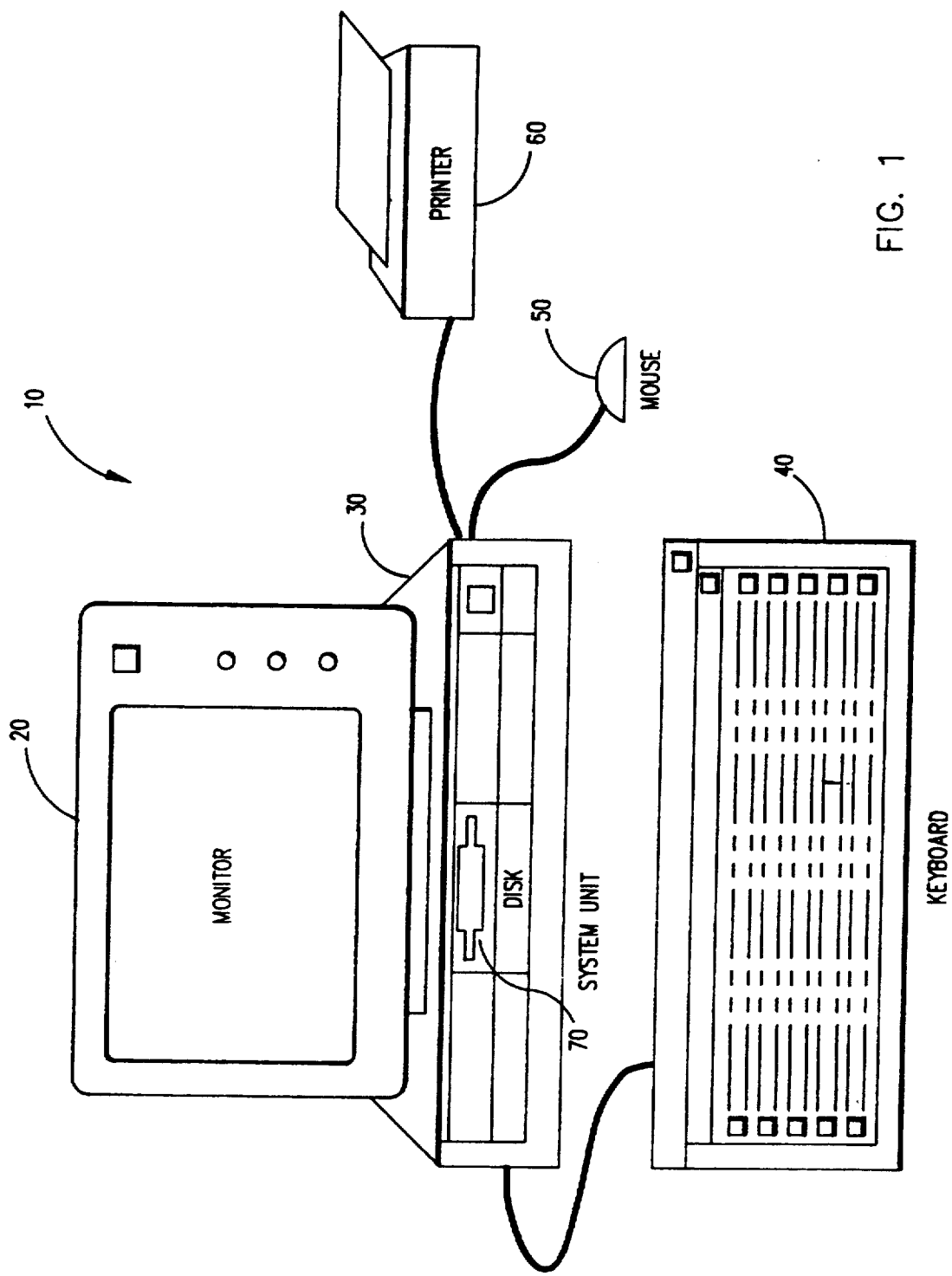
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50. An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course, those skilled in the art are aware that other conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which CPU local bus is coupled via a buffer to a system bus. The system bus is interconnected to and interacts with the I/O devices such as the keyboard 40, mouse 50, disk drive 70, monitor 20 and printer 60. Furthermore, in accordance with the present invention, the system unit 30 may also include a third bus comprising a Micro Channel TM bus for interconnection between the system bus and other (optional) input/output devices, memory, etc.

Figure 2:
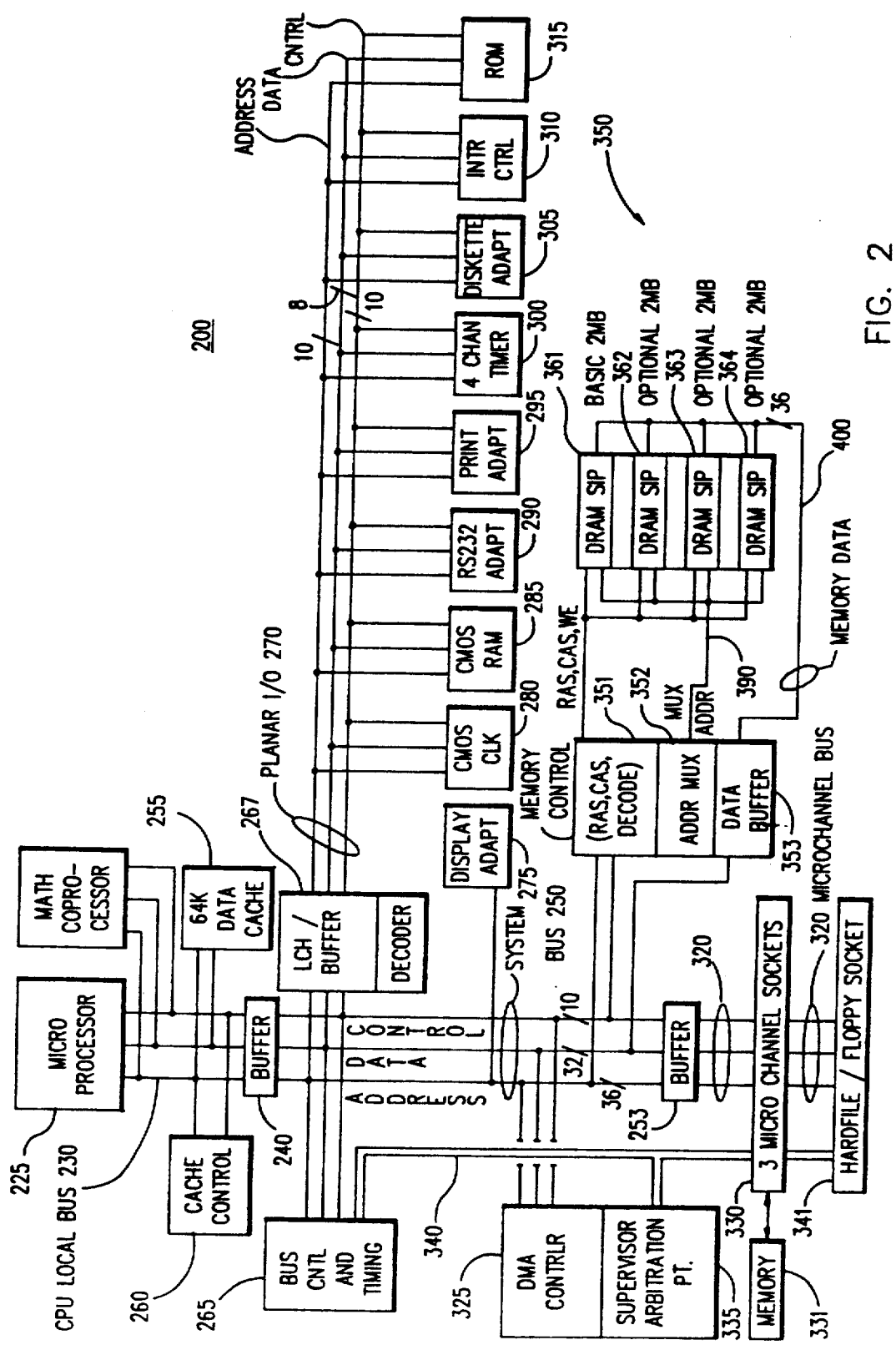
FIG. 2 is a detailed block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache control 260 (which may include an 82385 cache controller) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253.

The system bus 250 is also connected to a bus control and timing element 265 and a DMA controller 325. An arbitration control bus 340 couples the bus control and timing element 265 and a central arbitration element 335. Memory 350 is also connected to the system bus 250. The memory 350 includes a memory control element 351, an address multiplexer 352 and a data buffer 353. These elements are, interconnected with memory elements 361 through 364 via buses RAS, CAS, WE and 390 and 400 respectively, as shown in FIG. 2.

A further buffer 267 is coupled between the system bus 250 and a planar bus 270 of an I/O subsystem 200. The planar bus 270 includes address data and control components, respectively. Coupled along the planar bus 270 are a variety of I/O adaptors and other components such as the display adaptor 275 (which is used to drive the monitor 20), a clock 280, additional random access memory 285, an RS 232 adaptor 290 (used for serial I/O operations), a printer adaptor 295 (which can be used to drive the printer 60), a timer 300, a diskette adaptor 305 (which cooperates with the disk drive 70), an interrupt controller 310 and read only memory 315. The buffer 253 provides an interface between system bus 250 and an optional feature bus such as the Micro-Channel ™ bus 320 represented by the Micro-Channel ™ sockets 330 and 341. Devices such as memory 331 may be coupled to the bus 320.

While data for cache writes may be derived from memory 350, such data may also be derived from other memory such as memory installed on the Micro-Channel ™ bus.

In a conventional 80386/82385 microcomputer system, the user is faced with selecting one of two unattractive alternatives in connection with memory operations and particularly operations following a read miss.

In such a system during a read cycle the microprocessor 225 places an address on the address component of the CPU local bus 230. The cache control 260 responds to the address and determines whether the required information is contained in the cache memory 255. In the event that the information is found in the cache memory 255, the cache memory 255 is addressed, it places the data on the data component of the CPU local bus where it is available to the microprocessor 225. In the event that the information required is not in the cache memory 255, then the cache control 260 enables the buffer 240 so that the address can be passed from the CPU local bus 230 to the system bus 250. When the required address reaches the system bus 250 it is available to memory 350 and after a period of time required by the characteristics of the memory 350, the addressed data appears on the data component of the system bus 250. The data is coupled through the buffer 240 where it is then available both to the cache memory 255 and to the microprocessor 225. The information will be used in the cache memory 255 to be written therein so that in the event the same information is required, a further access to memory 350 is not required. Similar operations can occur with memory on the planar bus 270 or on the optional feature bus 320. In the case of the optional feature bus, address information is coupled through buffer 253 to memory 331 on the optional feature bus. Data from such memory is coupled back through buffer 253, system bus 250 to the CPU local bus 230 via buffer 240.

As has been mentioned, however, the peculiarities of the 82385 require that information extracted as a result of a read miss be available at the CPU local bus for writing into the cache memory 255 before it is required by the processor 225. In other words, the timing requirements placed on the memory 350 or other memory by the 82385 are more stringent than the timing requirements dictated by the 80386. The manufacturer of the 82385 thus suggests that the user can either:

1) select memory elements (such as the elements 361-364) in main memory 350 or other memory to be fast enough to meet the timing requirements of the 82385 with a specified wait state, or 2) ensure that the dual operation initiated by a read miss occupies an additional wait state.

As will be described below, the present invention eliminates this requirement to select one of two undesirable alternatives by in effect eliminating the stringent timing requirements dictated by the 82385 so that the timing requirements placed on main memory 350 or other memory are no more stringent than those dictated by the 80386 processor.

Figure 3:
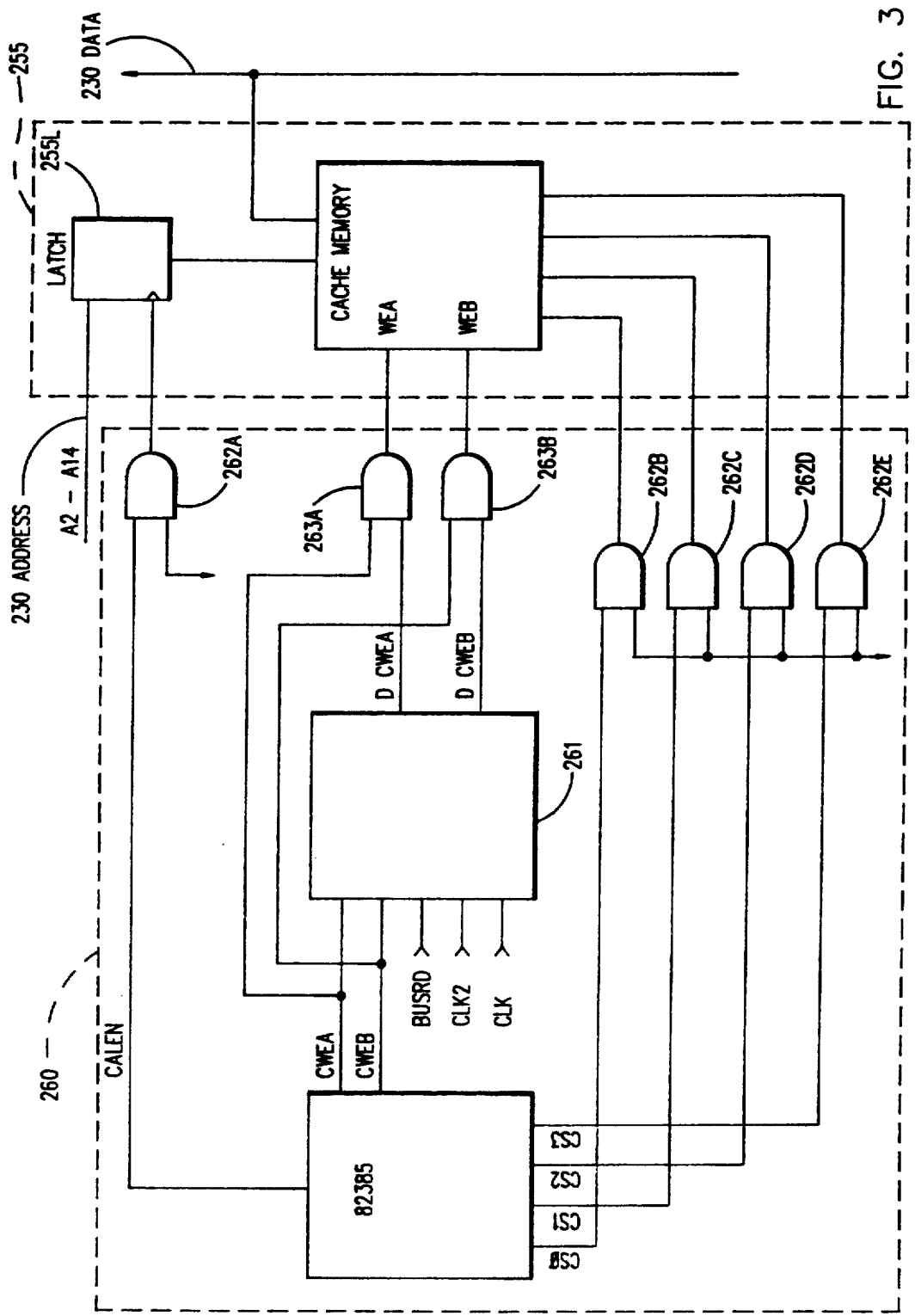
FIG. 3 is a detailed block diagram of the 82385, the cache random access memory, the logic circuit and buffers of the present invention.

In order to implement the invention, the cache control 260 has added to it several logic elements, beyond the 82385 chip as is illustrated in FIG. 3.

FIG. 3 shows, in block diagram form, the detailed components of the cache control 260 and the cache memory 255. More particularly, the cache memory 255 is coupled to the data element of the CPU local bus 230 and to the address component of the CPU local bus 230.

The cache control 260 includes the 82385 cache controller as well as a logic element 261. FIG. 3 shows those output signals of the 82385 which are pertinent to cache write operations. Those include the cache latch enable (CALEN), the cache write enables including CWEA (for bank A) and CWEB (for bank B) and the chip select signals CS0, CS1, CS2 and CS3.

As shown in FIG. 3, logic 261 receives, as inputs, the CWEA and CWEB along with two clocking signals, CLK and CLK2 (the former is exactly half the rate of the latter) and BUSRD (indicating a system bus read). BUSRD becomes active for operations which take place on the system bus 250. Any memory (other than cache) read takes place (at least in part) on the system bus 250.

Logic 261 responds to its input signals and under the appropriate circumstance generates DCWEA (Delayed Cache Write Enable A) or DCWEB (Delayed Cache Write Enable B). More particularly, in the event CWEA is active and BUSRD is active (thus unmistakably indicating a read miss), then at the appropriate time DCWEA will be generated. In a like fashion, in the presence of an active CWEB as well as an active BUSRD, then at the appropriate time DCWEB will be generated.

The logic 261 outputs DCWEA and DCWEB each provide an input to the associated logic gate 263A or 263B. Each of these gates also receives a corresponding input from the associated output of the 82385, i.e. gate 263A has its other input provided by CWEA and likewise 263B has its other input provided by CWEB.

In addition to the logic gates 263A and 263B, the cache control 260 further includes a buffer 262 comprising buffer elements 262a-262e, one for each of the signals CALEN, CS0, CS1, CS2 and CS3. As shown in FIG. 3, each element of the buffer 262 is a logic gate which is permanently, partially enabled (by one input being tied to the appropriate potential). The other input to the buffer element comes from the corresponding output of the 82385. The output of the buffer element 262a is input as the control input to the latch 255L. The outputs of the buffer elements 262b-262e are directly input to the cache memory 255 as CS0-CS3.

Figure 4:
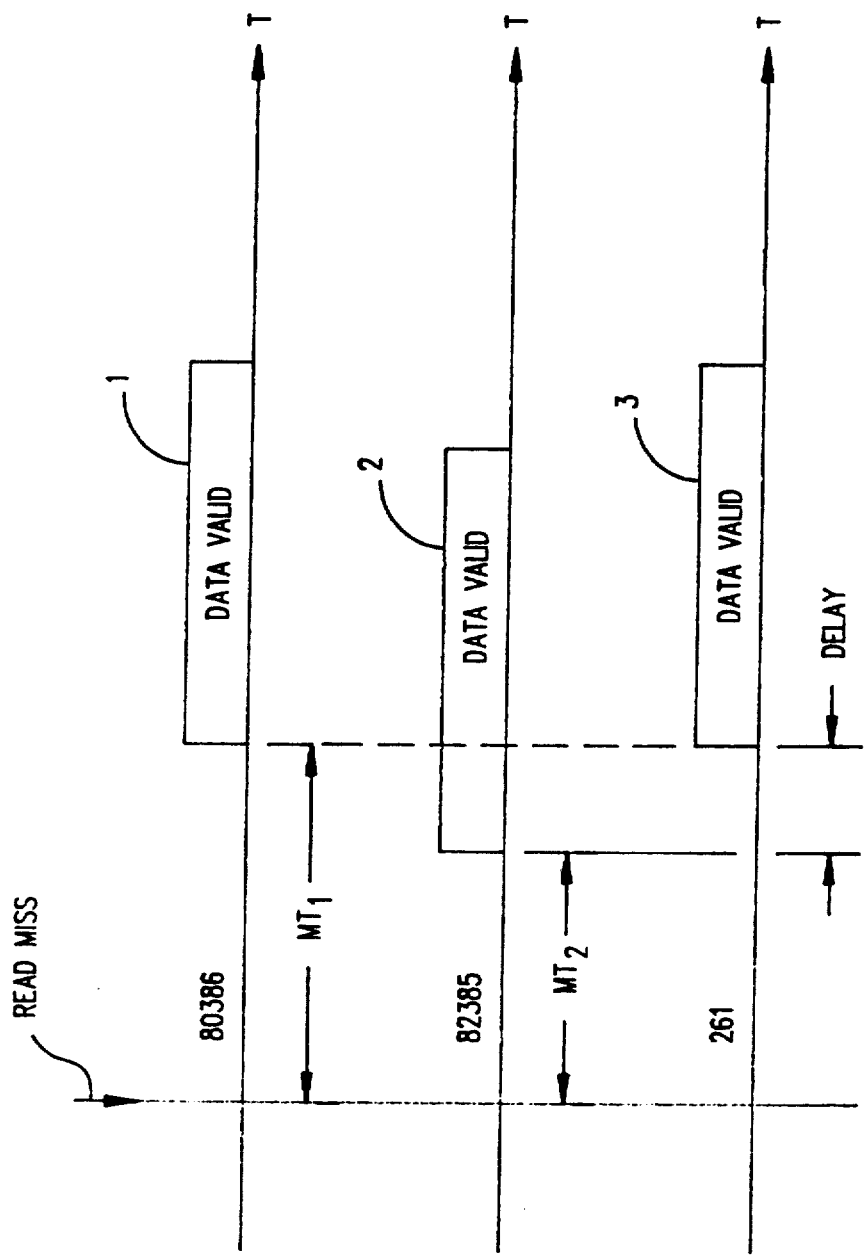
FIG. 4 is a timing diagram illustrating the different timing requirements of the 82385 and the 80386.

Before operation of the components of FIG. 3 is described, reference is made to FIG. 4 to illustrate appropriate timing.

FIG. 4 shows three timing diagrams. Each of the diagrams begins at the time a system bus operation occurs, i.e. when BUSRD becomes active. The line labeled 80386 shows that at a time $MT_1$ following commencement of a read miss, data output from memory is valid. The time $MT_1$ is the timing tolerance imposed on the memory by the requirements of the 80386.

On that line of FIG. 4 labeled 82385, the timing requirements imposed by the 82385 are illustrated. More particularly, the 82385 generates CWEA and CWEB such that valid data must be available from memory by the time $MT_2$, i.e. at a time before valid data is required by the 80386. Thus FIG. 4 shows the more stringent timing requirement ($MT_2$) of the 82385 compared to the more lenient timing requirements ($MT_1$) of the 80386.

FIG. 4 also shows the effect of the logic 261. More particularly, the DCWEA and/or DCWEB outputs of the logic 261 track the more lenient timing requirements of the 80386. More particularly, the DCWEA and/or DWCEB are delayed by the "delay" shown in FIG. 4 as compared to the CWEA and CWEB. Thus, by this delay, the more lenient timing requirements of the 80386 are the only timing requirements imposed on main memory 350 in the event of a read miss. This enables more inexpensive memory components to be used as compared to the components which would have been required for the 82385 in order to complete a read miss within a specified number of wait states.

The internal components of the logic 261 implement the following logic equations:

/DCWEA:=/BUSRD & /CLK & /CWEA

/DCWEB:=/BUSRD & /CLK & /CWEB where the operator "&" is a logical AND, the operator "/" represents negation and the other signal elements (aside from BUSRD) have already been defined.

FIGS. 5A-5C are useful in explaining the operation of the elements shown in FIG. 3. More particularly, FIG. 5A shows a typical CWE signal. The signal has two transitions, a first low going transition and a second high going transition. The cache 255 is arranged to effect a write event on the high going transition of CWE such as is illustrated in FIG. 5A.

FIG. 5B shows typical CWE, DCWE and the output of the gate (either 263A or 263B) for a read miss condition. As shown on a first line, the CWE signal is generated by the 82385. Under a read miss condition, the logic element 261 generates the DCWE delayed from the CWE by an appropriate delay. The third line of FIG. 5B (labelled GATE) shows the output of the appropriate gate (263A or 263B). More particularly the output of the gate 263 has a low going transition produced as a result of the low going transition CWE. When the CWE signal undergoes a high going transition, the gate output remains low because of the low input from DCWE. It is only when DCWE goes high that the output of the gate goes high so that timing of the write event is occasioned by the high going transition of DCWE. As is seen in the third line of FIG. 5B, the write event is delayed by the delay interposed by logic element 261 as compared with the high going transition of CWE.

FIG. 5C shows the operation during a cache write other than one occasioned by a read miss. The first line of FIG. 5C (labelled CWE) shows the CWE signal as generated by the 82385. Because FIG. 5C illustrates a cache write not occasioned by the a read miss, the DCWE shows no transition at all (BUSRD remains inactive). Accordingly, the output of the gate (263A or 263B) is synchronous with the CWE such that the write event is not delayed at all.

In an embodiment of the invention actually constructed, the duration DELAY is on the order of 25 nanoseconds.

The logic equations which have been referenced above are reproduced immediately below. In this material the symbols have the following meanings associated with them:

| Symbol | Definition |
|---|---|
| / | Negation |
| := | A registered term, equal to |
| = | A combinatorial term, equal to |
| & | Logical AND |
| + | Logical OR |

Logic Equations

/BUSRD:=BUSRD & BUSCYC385 & /BADS & /(BW/R) & CLK  (1)
+ BUSRD & /PIPECYCLE385 & /(BW/R) & CLK
+ /BUSRD & BREADY
+ /BUSRD & /MISS1
+ /BUSRD & /CLK
/BUSCYC385:=BUSCYC385 & /BADS & CLK  (2)
+ BUSCYC385 & /PIPECYC385 & CLK
+ BUSCYC385 & /BT2 & CLK
+ /BUSCYC385 & BREADY
+ /BUSCYC385 & /CLK
/PIPECYC385:=PIPECYC385 & /BADS & /BUSCYC385 & CLK & /BREADY  (3)
+ PIPECYC385 & /MISS1 & BT2 & /BUSCYC385 & CLK & /BREADY
+ /PIPECYC385 & /CLK
/MISS1:=MISS1 & BUSCYC385 & CPUNA & /BADS & /(BW/R) & CLK & NCA  (4)
+ MISS1 & /BUSCYC385 & /BADS & /(BW/R) & CLK & NCA & /BREADY
+ /MISS1 & CLK
+ /MISS1 & BREADY
/CPUNA:=/MISS1 & CLK & CPUNA & /NACACHE  (5)
+ /MISS1 & CLK & CPUNA & /BREADY & /BUSCYC385
+ /CPUNA & /CLK
+ /CPUNA & /MISS1 & CLK
+ /CPUNA & CLK & BREADY
+ /CPUNA & BUSCYC385 & NACACHE & CLK
/BT2:=BUSCYC385 & PIPECYC385 & /BADS & CLK & BT2  (6)
+ BUSCYC385 & /PIPECYC385 & BADS & CLK & NACACHE & BT2
+ MISS1 & /BUSCYC385 & /BADS & /(BW/R) & CLK & NCA & /BREADY
+ /MISS1 & /BREADY & /BUSCYC385 & CLK
+ /BT2 & BREADY & NACACHE

|                          |                                                                                                               |
| ------------------------ | ------------------------------------------------------------------------------------------------------------- |
| + /CLK & /BT2            |                                                                                                               |

In the foregoing logic equations the following signals are described or referred to in the cited Intel publications:

| BADS     |                                                                                                           |
| -------- | --------------------------------------------------------------------------------------------------------- |
| BREADY   |                                                                                                           |
| (BW/R)   | actually referred to as BW/R, the parenthesis are used to indicate that the entire term is one signal     |
| CLK      |                                                                                                           |

BADS, when active indicates a valid address on the system bus 250. BREADY is a ready signal from the system bus 250 to the CPU local bus 230. BW/R defines a system bus 250 Write or Read. CLK is a processor clocking signal which is in phase with the processor 225.

Equations (1)-(6) define:
BT2
BUSCYC385
BUSRD
CPUNA
MISS1
PIPECYC385
in terms of the defined signals, the signals described or referred to in the cited Intel publications and NCA and NACACHE.

BT2 reflects the state of the system bus 250. The state BT2 is a state defined in the cited Intel publications.

BUSCYC385 also reflects the state of the system bus 250. It is high for bus states BTI, BT1, BT1P and low for bus states BT2, BT2P and BT2I (again these are bus states referenced in the cited Intel publications).

/BUSRD is active during reads occurring on the system bus 250.

CPUNA is a signal to the 80386 allowing pipelined operation.

MISS1 is active defining the first cycle in a double cycle for handling 64 bit read to cacheable devices.

PIPECYC385 is active during BT1P (which is a bus state referred to in the cited Intel publications.

NCA is a signal created by decoding the address component on the CPU local bus 230 to reflect, when active, a non-cacheable access. Cacheability is determined by a tag component (A31 to A17) and programmable information defining what tags (if any) refer to cacheable as opposed to non-cacheable addresses.

NACACHE is a signal similar to the BNA signal. BNA is a system generated signal requesting a next address from the CPU local bus 230, and is referenced in the cited Intel publications. NACACHE differs from BNA only in respect of the fact that BNA is created for 32K cache while NACACHE is created for a 64K cache. So long as the cache memory is 32K, as cited in the Intel publications the NACACHE signal referred to here could be replaced by the BNA signal. In an embodiment actually constructed the logic element 261 was in the form of a programmable logic array. It should be apparent that other and further logic devices can be used to perform the identical function. While a preferred embodiment of the invention has been described herein, it should be apparent that many and varied changes can be made without departing from the spirit and scope of the invention which is to be construed, not by the example described herein, but by the claims attached hereto.

We claim:

1. An improved 80386/82385 cache multi-bus microcomputer system for initiating a delayed cache write condition following a read miss condition for improving system tolerance to slower memory components, said microcomputer system comprising:

an 80386 processor for executing instructions having read miss operations each of which is completed in one instruction cycle;

a cache subsystem including an 82385 cache controller, a cache memory and a local bus connecting said 82385 cache controller and said cache memory to the 80386 processor;

a main memory coupled to said local bus by way of a system bus;

means controlled by the processor and cache subsystem during each read miss operation for transferring data from the main memory to the local bus and for transferring said data from the local bus to the processor during said each read miss operation at a time determined by the processor;

logic means responsive to a cache write condition caused by said cache controller during said read miss operation for delaying cache write enable signals, said delay logic means including a) means responsive to a system bus read condition produced by said cache controller during said read miss operation and to a cache write enable signal from a write enable output of said 82385 cache controller for producing at a write enable terminal a signal delayed with respect to said write enable signal, said write enable signal terminating prior to said determined time;

b) a logic gate with a first input coupled to the write enable output of said 82385 cache controller and a second input coupled to said write enable terminal and an output coupled to a write enable input of said cache memory, said logic gate responsive to the write enable signal and to said delayed signal for generating a cache memory write enable signal at the cache memory input which extends to said determined time; and c) buffer means for delaying transmission of chip select signals from said 82385, said buffer means with an input for each of said chip select signals and an output for each of said chip select signals, outputs of said buffer means coupled to chip select terminals of said cache memory, said cache memory write enable signal and said delayed chip select signals effective to initiate a cache write condition at said determined time.

2. A microcomputer system comprising:

a processor, a cache memory and a cache controller interconnected by a local bus, and a main memory connected to the local bus via a system bus and a buffer means between the system bus and the local bus;

said processor executing instructions having write operations and instructions having read miss operations, each of which operations is completed in one instruction cycle;

said cache controller responsive to processor write operations for generating a cache memory write enable signal for writing data identified by a write operation into the cache memory;

control means effective during a processor read miss operation, when desired data is in the main memory but not the cache memory, for transferring the desired data from the main memory to the local bus via the system bus and buffer means and for transferring the desired data from the local bus to the processor at a cycle time during said processor read miss operation determined by the processor;

said cache controller responsive to said read miss operation for generating said cache memory write enable signal, which signal terminates prior to said determined cycle time; and delay logic responsive to said cache memory write enable signal during said each processor read miss operation for producing a delay signal for transferring said desired data from the local bus to the cache memory during said each read miss operation at a time not preceding said determined cycle time.

3. A microcomputer system comprising:

a processor for executing program instructions including read, read miss and write operations each of which are completed during the execution of one instruction;

a cache memory and a cache controller coupled to said processor by means of a local bus and responsive to processor read and write operations for transferring data between said cache memory and said processor when data identified by the read and write operations is stored in or to be stored into said cache memory, said cache controller generating a cache memory write enable signal during said write operations for initiating writing of processor data into the cache memory;

a system main memory coupled to said local bus by way of a system bus and an interface between the system bus and the local bus;

transfer means effective during a processor read operation, when data identified by the read operation is not stored in said cache memory, i.e. a read miss operation, for transferring the identified data from said main memory to said local bus for both the processor and the cache memory by way of the system bus and the interface;

said processor and said cache controller respectively including processor read operation timing means and cache controller write timing means effective during each read miss operation for respectively transferring said identified data from the local bus to the processor during the read miss operation at a time determined by the processor and for generating said cache memory write enable signal which terminates prior to said determined time when said data is required for transfer to the processor; and delay logic means responsive to said cache memory write enable signal during a read miss operation for generating a delay signal for initiating transfer of said identified data from said local bus to said cache memory during said read miss operation at a time not preceding said determined time.

* * * * *